United States Patent

[11] 3,613,087

[72] Inventors William F. Brown
Wappingers Falls;
Jerry L. Nolting, Fishkill, both of N.Y.
[21] Appl. No. 826,310
[22] Filed May 21, 1969
[45] Patented Oct. 12, 1971
[73] Assignee Texaco Inc.
New York, N.Y.

[54] METHOD FOR THE CONTRACTION OF DATA
3 Claims, 1 Drawing Fig.
[52] U.S. Cl. .................................................. 340/172.5
[51] Int. Cl. .................................................. G06f 5/00
[50] Field of Search ........................................... 340/172.5,
146.2; 235/157

[56] References Cited
UNITED STATES PATENTS
3,413,611 11/1968 Pfuetze.......................... 340/172.5

Primary Examiner—Raulfe B. Zache
Attorneys—K. E. Kavanagh and Thomas H. Whaley

ABSTRACT: Methodology and apparatus for representing many numbers in an ordered sequence of numbers by substitute numbers where each such substitute number consists of fewer digits than the number for which it has been substituted and storing and processing signals representative of all the numbers in the ordered sequence, including the substitute numbers.

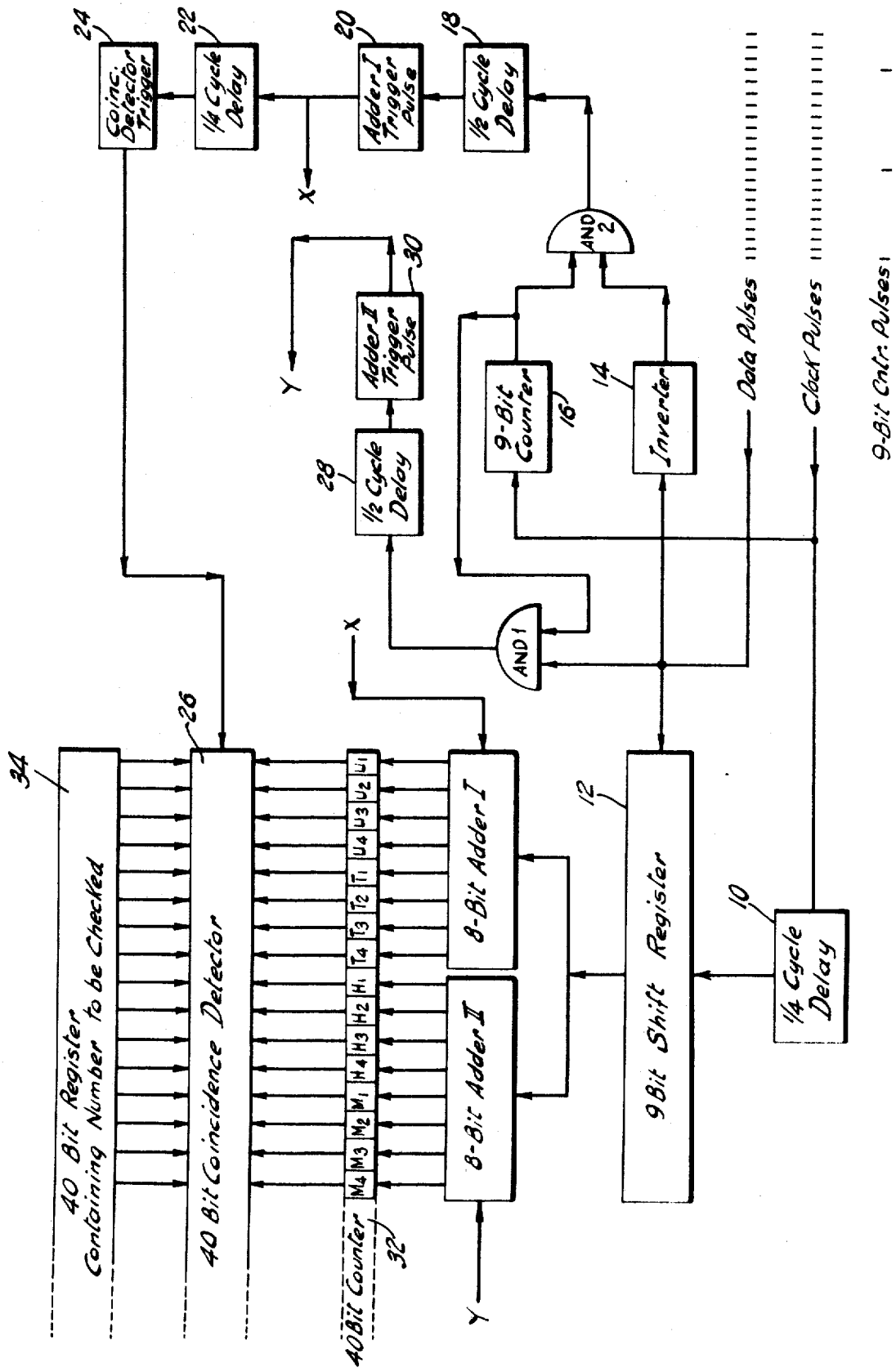

METHOD FOR THE CONTRACTION OF DATA

BACKGROUND OF THE INVENTION

The invention, hereinafter set forth, pertains, in general, to representing a number (e.g. an account number) which actually consists of a large number of digits by a substitute number consisting of relatively fewer digits and storing and processing signals representative of said substitute number. More particularly, the invention pertains to representing many numbers among an ordered sequence of numbers (e.g., numbers ranged in ascending or descending order of magnitude) by substitute numbers where each substitute number consists of fewer digits than the number for which it has been substituted and storing and processing signals representative of all numbers in the ordered sequence, including said substitute numbers.

Although the subject invention as hereinafter set forth with appropriate references to the accompanying drawing figures is illustratively directed to credit verification of credit card account numbers it is to be understood that the invention's field of use is not so limited. The invention may be practiced in fields other than credit verification.

SUMMARY OF THE INVENTION

One object of the present invention is to substantially reduce the number of signals representing digits which have to be stored in a data processing system.

Another object of the invention is to represent many numbers among an ordered sequence of numbers by substitute numbers where each such substitute number consists of fewer digits than the number for which it has been substituted.

In accordance with one illustration of the methodology of the invention delinquent, or bad credit risk, credit card account numbers which have been randomly acquired are stored in binary form in either ascending or descending order of magnitude on a suitable storage medium such as for example magnetic tape, punched tape or a phonograph-type disc having grooves cut therein. In the decimal numbering system (base 10), each such account number consists, in the example used hereinafter, of 10 decimal digits. However, current data processing equipment is often based on the binary number system (base 2). If each individual decimal digit of each individual 10 decimal digit account number is encoded in binary form, 40 binary digits or bits would be required to represent each such account number. Hence, 40-bit positions for each account number would be required and this is a relatively high storage space requirement. In accordance with the invention, the delinquent account numbers are stored in a suitable storage medium in an ordered sequence; e.g. in ascending order of magnitude. Hence, in many cases successively stored delinquent account numbers will differ in the lesser significant digit positions or locations.

Briefly, in accordance with the invention, all 40 bits representing a first or leading delinquent account number in a first range of such account numbers is recorded on a suitable storage means. If, for example, the next succeeding 50 such account numbers in the same range of ascending numbers differ by no more than at most 9999 (thousands positions, or fourth from the least significant digit) then only the last four decimal digits (or 16 binary digits plus 2 "steering digits" binary digits totaling 18 binary digits) need to be stored to represent each of the successive delinquent account numbers.

Although the invention is hereinafter illustratively described as allowing successive account numbers to change by no more than the last four decimal digits (performed, however, in binary coded form) it is to be understood that the same methodology applies to allowing more than the last four decimal digit numbers to change from a first or leading number in a range.

Apparatus is disclosed hereinafter and shown by way of illustration in the accompanying drawing for making a comparison with a credit card account number comprising 10 decimal digits represented in binary coded form and comparing it with the stored data according to the methodology hereinbefore discussed for the purpose of verifying the credit of a proffered credit card.

Other objects as well as the various features and advantages of the invention are hereinafter set forth where a specific illustrative embodiment of the invention is described in detail with reference to the accompanying drawing.

BRIEF DESCRIPTION OF THE DRAWING

In the drawing, there is shown a block diagram, among other things, indicating the operation of the overall system according to the invention.

DESCRIPTION OF THE PREFERRED EMBODIMENT

In accordance with the methodology of the invention a plurality of poor risk credit card numbers is stored in a suitable storage medium (not shown in the drawing) in ascending order or magnitude. While the illustration of a preferred embodiment of the invention, hereinafter appearing stores said numbers in ascending order, it is to be understood that they could equally be stored in descending order of magnitude. Each account number is in reality comprised of 10 decimal digits. It is to be understood that the account number system could employ more than or less than 10 such digits. Moreover, as will be appreciated from the discussion hereinafter appearing, each account number is encoded in binary form and accordingly stored in the storage medium in binary signal form.

For purposes of illustration let it be assumed that the aforesaid plurality of account numbers to be stored in ascending order in the storage medium are represented as in table I following:

TABLE I

| Channel | Full account number in decimal form | | | | | | | | | | Account numbers last four decimal digits in binary form | | | | | | | | | | | | | | |
|---|---|---|---|---|---|---|---|---|---|---|---|---|---|---|---|---|---|---|---|---|---|---|---|---|---|
| | | | | | | | | | | | Thousands | | | | Hundreds | | | | Tens | | | | Units | | | |
| | | | | | | | M | H | T | U | M4 | M3 | M2 | M1 | H4 | H3 | H2 | H1 | T4 | T3 | T2 | T1 | U4 | U3 | U2 | U1 |
| 1 | 1 | 2 | 3 | 4 | 5 | 6 | 2 | 2 | 2 | 2 | 0 | 0 | 1 | 0 | 0 | 0 | 1 | 0 | 0 | 0 | 1 | 0 | 0 | 0 | 1 | 0 |
| 2 | 1 | 2 | 3 | 4 | 5 | 6 | 2 | 2 | 3 | 4 | 0 | 0 | 1 | 0 | 0 | 0 | 1 | 0 | 0 | 0 | 1 | 1 | 0 | 1 | 0 | 0 |
| 3 | 1 | 2 | 3 | 4 | 5 | 6 | 2 | 3 | 0 | 0 | 0 | 0 | 1 | 0 | 0 | 0 | 1 | 1 | 0 | 0 | 0 | 0 | 0 | 0 | 0 | 0 |
| 4 | 1 | 2 | 3 | 4 | 5 | 6 | 9 | 0 | 0 | 1 | 1 | 0 | 0 | 1 | 0 | 0 | 0 | 0 | 0 | 0 | 0 | 0 | 0 | 0 | 0 | 1 |
| . | | | | | | | | | | | | | | | | | | | | | | | | | | |
| . | | | | | | | | | | | | | | | | | | | | | | | | | | |
| N | 1 | 2 | 3 | 4 | 5 | 9 | 9 | 9 | 9 | 9 | All 40 bits are recorded | | | | | | | | | | | | | | |

It is to be understood that with respect to table I the account numbers as stated before are stored in binary digit form. Also, it is to be understood that the storage may be serial storage or parallel storage depending on the method and recording method used.

As shown in table I, in the first channel, i.e., channel 1, on the recording medium, the lead number or first number recorded is the 10 decimal digit number 1, 2, 3, 4, 5, 6, 2, 2, 2, 2. As indicated in the table, the four least significant decimal digits are indicated. For example, the units digit is headed in the column with the letter "U" the 10 digit is headed with the letter "T" the hundreds digit is indicated by the letter "H" and finally the thousands digit is headed with the letter "M.38 Also shown in table 1 is the binary representation for the aforementioned last four significant digits i.e. the units through thousands digits. Each of the last four decimal digits is encoded in binary form. As shown in table I the four binary digits representing the decimal unit digit "U" are tabulated in the columns headed by the unit binary digits designated "U1," "U2,"'"U3" and "U4." Similarly the binary encoded tens digit "T" is tabulated in table I under the headings "T1," "T2," "T3" and "T4." Similarly the hundreds digits which are encoded in binary form are tabulated under the headings "H1," "H2,"'"H3" and "H4." The thousands digits "M" is encoded in binary form under the headings "M1," "M2," "M3" and "M4."

As indicated in table I the lead number in channel 1 is recorded such that all of its digits are placed on the storage medium, magnetic tape etc. in other words all 40 binary digits or bits (4 binary digits or bits per decimal digit) are recorded. Only the last four decimal digits which are represented by 16 binary bits are shown in table 1. In channel 2 the next number in ascending order of magnitude is recorded. However, note that the number in channel 2 differs from the lead number in channel 1 only in the units and tens digits. The number in channel 1 that is the lead number ends in the decimal digits 22 whereas the next number in channel 2 ends in the tens and units digits 34. Thus, the number in channel 2 need only substitute the number 34 for the number 22 with reference to channel 1 when recording the channel 2 number. Similarly, the number in channel 3 differs from the numbers in channel 2 and channel 1 in the hundreds, tens and units digits. That is to say that the numbers in channel 3 ends in the decimal digits 300. Thus, only the binary bits representing the number 300 as differing from the channel 2 number 234 or as different from the channel 1 number or lead number 222 need to be recorded. As indicated in table I the number recorded in channel 4 has for its last four decimal digits 9001. Hence, only the 16 binary bits representative of this decimal number need to be recorded.

As shown in table I the Nth digit changes in the tens of thousands digit i.e. the last five decimal digits being 9999. Hence, all 40 bits need to be recorded to start with what is in fact a new lead number in the Nth channel from there on successive differences which do not differ from each other by more than 9999 need to be recorded. However, these are recorded with binary bits the maximum number of which to represent the last four decimal digits will number 16.

Thus the basic methodology of the proposed system is to change no more than the last four decimal digits in binary form after having recorded the complete binary encoded lead number. From the following description with reference to the drawing figure that is set forth a method for storing data in condensed form, that is to say, that after recording all 40 binary digits representing the lead number, successive numbers are recorded by changing in binary form the last four significant digits. More than or less than the last four significant decimal digits may be changed (in binary form) as desired. However, for purposes of illustration, the following discussion is made with reference to changing not more than the last four significant decimal digits in binary form.

In the drawing there is shown one way of implementing the aforesaid methodology. As suggested a series of data pulses representative of the various binary bits are withdrawn from a suitable storage medium. As is discussed hereinafter 18 bits are employed. Of these 18 bits, 16 bits represent the last four significant decimal digits, while two of these 18 bits are used to steer the digits to appropriate elements shown in the block diagram.

As shown a source of clock pulses is delivered to a quarter cycle delay unit 10. From the quarter cycle delay unit 10 the clock pulses are routed directed to a 9-bit shift register 12.

Also as shown, the data pulses representative of the binary bits are routed to the 9-bit shift register 12 and to one input of an AND gate identified as AND 1. In addition the data pulses are also routed to the input of an inverter 14.

In addition, the clock pulses are routed to the input of a 9-bit counter 16. The inverted data pulse output from inverter 14 is routed to one input of a second AND gate identified as AND 2. Also as shown the output from the 9-bit counter is an output pulse which is delivered to the second input of the AND gate 2. In addition the output of the nine-bit counter is also delivered to a second input of AND gate 1.

The output from the gate AND 2 is fed to the input of a half cycle delay unit 18. The output from the half cycle delay unit 18 is fed to a trigger pulse unit identified as adder I trigger pulse 20. From the pulse unit 20, the output identified as output X is delivered to another quarter cycle delay unit 22 and also to the input of an eight-bit adder unit identified as eight-bit adder I. The output signals from the quarter cycle delay unit 22 drive a coincidence detector trigger unit 24. The coincidence detector trigger unit 24 is used to drive a 40-bit coincidence trigger unit 26.

The output from AND gate AND I is fed to the input of a half-cycle delay unit 28 as shown. The output signals from the half-cycle delay units 28 are fed into a trigger pulse unit identified as adder II trigger pulse 30. The output from unit 30 identified as output Y is then routed to drive an adder unit identified as eight-bit adder II.

Also shown in the drawing is a 40-bit counter unit 32 which is controlled in part by the eight-bit adder I and in part by the eight-bit adder II. As shown the 40-bit counter 32 stores the units tens, hundred, and thousands digits U1 through M4 as indicated in the drawing. Ultimately, these bits U1 through M4 are delivered to the 40-bit coincidence detector unit 26 for comparison with a like credit card account number stored in the 40-bit register 34 which contains the credit card account number to be identified.

OPERATION

As indicated data pulses or bits and clock pulses or bits are employed. The data bits are recorded and used in units of nine bits. The last or ninth data pulse or bit is used as a steering pulse in conjunction with a pulse emitted by the 9-bit counter 16. This 9-bit counter provides one output pulse for each nine input clock pulses. If the last or ninth data pulse is a binary 1 the last data pulse and the simultaneous pulse from the 9-bit counter will pass through AND gate AND I the half-cycle delay unit 28 and trigger the adder 2 circuit 30 to add the first eight bits from the 9-bit shift register 12 into the one-hundreds and one-thousands bits in the 40-bit counter. In other words the 9-bit shift register 12 activates the eight-bit adder II to change the bits H1 through M4. The ninth bit or steering pulse is not, however, added into the 40-bit counter 32.

If the last or ninth data pulse or bit is a binary O the AND gate identified as AND 2 is used by combining the inverted 0 bit and the simultaneous bit from the 9-bit counter 16. AND gate 2 triggers the eight-bit adder circuit identified as eight-bit adder I to transfer the eight data signal bits into the ones and tens units of the 40-bit counter 32. That is the eight-bit adder I controls the bits identified as U1 through T4. This AND gate 2 signal is also used to further trigger another circuit such as for example the 40-bit coincidence detector 26.

The 9-bit shift register 12 is employed to store the eight data bits or signal bits plus the ninth or steering bit. Nine bits are required because if an eight-bit shift register were used, the ninth or steering bit would shift the first data bit before adding the trigger or pulse from AND gate AND 2 could be used. However, only data from the eight left hand bits in the shift register are added to the 40-bit counter.

While a specific embodiment of the invention has been shown and described in detail to illustrate the application of the inventive principles involved, it is nevertheless to be understood that the invention may be otherwise embodied without departing from such principles.

What I claim is:

1. A method of recording signals representative of a collection of numbers, each number being comprised of a plurality of digits, which numbers were at first randomly required and subsequently arranged in an ordered sequence of relative magnitude wherein N successive such numbers after a first such number differ from said first number by no more than a predetermined number of lesser significant digits without having to record signals representative of all the digits of every number in the collection comprising: recording on a storage medium having a finite storage space signals representative of all the digits of the first number of the ordered sequence; and, recording in succession signals representative of only no more than a predetermined number of the lesser significant digits of the N successive numbers of the ordered sequence of numbers, whereby signals representative of the entire collection of numbers is recorded on the storage medium within said finite storage space.

2. A method of recording a collection of randomly acquired numbers on a storage medium having a plurality of recording channels, each number being comprised of a plurality of digits and wherein none of the numbers in the collection differs from the lowest number in the collection in more than a predetermined number of lesser significant digit locations comprising: recording signal representative of all of the digits of the lowest number in the collection in a first channel of the storage medium; and, recording in succeeding channels in said storage medium signals representative of no more than the differing digits in the predetermined number of lesser significant digit locations of successively higher numbers in said collection.

3. A method of recording a collection of randomly acquired numbers on a storage medium having a plurality of recording channels, each number being comprised of a plurality of digits and wherein none of the numbers in the collection differs from the highest number in the collection in more than a predetermined number of lesser significant digit locations comprising: recording signals representative of all of the digits of the highest number in a first channel of the storage medium; and, recording in successive channels in said storage medium signals representative of no more than the differing digits in the predetermined number of lesser significant digit locations of successively lower numbers in said collection.